H. M. Street,
Gearing.

N° 29,634.  Patented Aug. 14, 1860.

Witnesses.
E. Cohen
J. Hirsch

Inventor
H. M. Street

UNITED STATES PATENT OFFICE.

HUGH M. STREET, OF DENMARK, TENNESSEE.

GEARING.

Specification of Letters Patent No. 29,634, dated August 14, 1860.

*To all whom it may concern:*

Be it known that I, HUGH M. STREET, of Denmark, in the county of Madison and State of Tennessee, have invented certain new and useful Improvements in Gearing; and I do hereby declare that the following is a full, clear, and exact description of the construction and operation of the same, reference being had to the accompanying drawings, in which—

Figure 1:
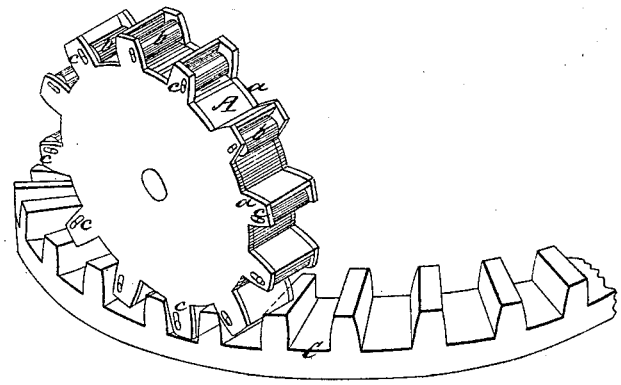
Figure 2:
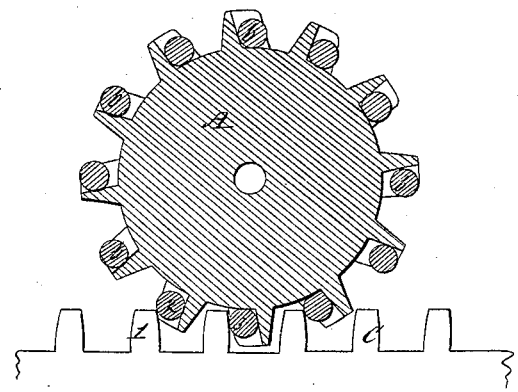

Figure 1 represents a perspective view of a cogged wheel on my improved plan. Fig. 2 represents a vertical section through the same.

My invention relates to the application of friction rollers to the cogs of gear wheels and consists in the peculiar manner in which I connect the friction rollers to said cogs whereby no pressure is exerted on their pivots but only on their circumferences and on the wheel itself thereby overcoming the difficulty which has heretofore existed in the application of such friction rollers.

To enable others skilled in the art to make and use my invention I will proceed to describe its construction and operation.

A represents the body of the wheel; it may be made of iron, or when made of wood, metal plates, *a*, may be secured to its sides or metal rings or segments on both sides of the cogs. The geometrical outlines of the cogs are similar to those according to which the cogs of gearing are generally shaped, but on each cog a recess is cut out into which the friction roller, *b*, is inserted, the pivots of which play loosely in the slots, *c*, of the sides of the cogs, the circumference of each roller being in contact with the inner face of its cog.

To illustrate the operation of this gearing the section of a horizontal cog wheel, C, of the usual construction is represented in the drawings in red lines as meshing in and driving the vertical wheel A. When the cog 1 in Fig. 2 comes in contact with the friction roller, 2, it causes the same to roll on the inner face of its cog until it arrives to the position 3 where it bears and rolls simultaneously on the circumference of the wheel and on the cog and exerts its entire pressure on these two places turning on its circumference during the time it is acted upon by the cogs of the horizontal wheel C while the pivots of the rollers are under no pressure as they have free play in the slots which only tend to keep the rollers in their places. This construction of the cogs is particularly adaptable to large wheels and for purposes on which bevel wheels are used, the construction of which requires more mechanical skill than that of cylindrical cogged wheels; the further advantage is that they do not require as accurate a workmanship and high finish as the common cog wheels the friction rollers compensating for irregularities which otherwise would cause a great amount of friction.

Having thus fully described the nature of my invention, I would state that I do not claim the application of friction rollers to the cogs of gear wheels as such have been used before, but—

What I do claim, and desire to secure by Letters Patent, is—

So connecting the friction rollers to the cogs of gear wheels by means of journals and slots, or their mechanical substitutes as that the entire pressure by which the wheel is driven shall be exerted on the circumference of the rollers which directly bear on the cogs and on the wheel itself and that no strain shall rest on the pivots of said rollers substantially in the manner and for the purposes herein described.

H. M. STREET.

Witnesses:
E. COHEN,
I. HIRSCH.